(12) United States Patent
Greenberg et al.

(10) Patent No.: US 8,312,048 B2
(45) Date of Patent: Nov. 13, 2012

(54) DATABASE APPLICATION NAVIGATION

(75) Inventors: Steven Miles Greenberg, Seattle, WA (US); Vitore Selca, Bellevue, WA (US); Andrew Robert Miller, Issaquah, WA (US); Stephen Lesser, Redmond, WA (US); Clinton Dee Covington, Redmond, WA (US); Ryan McMinn, Seattle, WA (US); Pavel R. Karimov, Redmond, WA (US); Konrad Tupaj, Kirkland, WA (US); Amarinder Singh Grewal, Redmond, WA (US); Robert Scott Cooper, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 388 days.

(21) Appl. No.: 12/468,067

(22) Filed: May 19, 2009

(65) Prior Publication Data

US 2010/0299347 A1 Nov. 25, 2010

(51) Int. Cl.
*G06F 17/00* (2006.01)
(52) U.S. Cl. ......... 707/791; 707/802; 707/822; 707/828
(58) Field of Classification Search ........... 707/600–899
See application file for complete search history.

(56) References Cited

U.S. PATENT DOCUMENTS

| | | | |
|---|---|---|---|
| 6,002,402 A | 12/1999 | Schacher | |
| 6,101,510 A | 8/2000 | Stone et al. | |
| 6,744,447 B2 | 6/2004 | Estrada et al. | |
| 6,772,139 B1 | 8/2004 | Smith, III | |
| 7,240,296 B1 | 7/2007 | Matthews et al. | |
| 7,290,008 B2 * | 10/2007 | Balva et al. | 707/756 |
| 7,343,351 B1 | 3/2008 | Bishop et al. | |
| 7,877,726 B2 * | 1/2011 | Sabbouh | 717/106 |
| 2004/0021679 A1 | 2/2004 | Chapman et al. | |
| 2004/0249801 A1 | 12/2004 | Kapur | |
| 2005/0198307 A1 | 9/2005 | Zoller et al. | |
| 2005/0246717 A1 * | 11/2005 | Poole et al. | 719/316 |
| 2007/0174291 A1 | 7/2007 | Cooper et al. | |
| 2008/0243529 A1 | 10/2008 | Fischer | |
| 2010/0199185 A1 | 8/2010 | Greenberg et al. | |

OTHER PUBLICATIONS

"International Search Report", Mailed Date: Dec. 1, 2010, Application No. PCT/US2010/034617, Filed Date: May 12, 2010, pp. 9.
"Accessing Database Objects Using HTTP," retrieved May 21, 2010 from http://msdn.microsoft.com/en-us/library/aa226552%28SQL.80%29.aspx, 2 pages.
"Chapter 25—Web Support in MS Office Applications", downloaded Nov. 17, 2008, from http:technet.microsoft.com/en-us/library/cc749845(printer).aspx, 40 pages.
Managing Database Connections, retrieved May 21, 2010 from http://devnet.asna.com/documentation/Help_Files/DCS_50/Managing_Database_Connections.htm, 4 pages.

(Continued)

*Primary Examiner* — Isaac M Woo
(74) *Attorney, Agent, or Firm* — Hope Baldauff Hartman, LLC

(57) ABSTRACT

A database server application program is provided that is configured to provide a programmable interface into a database application by way of database services uniform resource locators (URLs). A database services URL utilized by the database application can be updated programmatically by program code executing within or under control of the database server application program. A macro action for use in conjunction with a database server application that provides functionality for displaying a database object, such as a form or report, in-place in a Web browser is also disclosed.

20 Claims, 8 Drawing Sheets

OTHER PUBLICATIONS

"RadTreeView for Silverlight," downloaded Nov. 17, 2008 from http://www.telerik.com/products/silverlight/treeview.aspx, 2 pages.

Chapter 11—The WebBrowser Control, Microsoft TechNet, retrieved May 21, 2010 from http://www.microsoft.com/technet/archive/ie/reskit/ie4/Part2/part2c.mspx?mfr=true, 5 pages.

Fraternali et al, "A Conceptual Model and a Tool Environment for Developing More Scalable, Dynamic and Customizable Web Application," 1998, Proceedings of the 6th International Conference on Extending Database Technology, 16 pages.

Jellema, Lucas "URL based Navigation into a JSF application—on PhaseListener and ViewHandler," Mar. 16, 2008, retrieved May 21, 2010 from http://technology.amis.nl/blog/2967/url-based-navigation-into-a-jsf-application-on-phaselistener-and-viewhandler, 6 pages.

Lang, Joerg "Silverlight Database Deep Zoom," Mar. 26, 2009, retrieved May 21, 2010 from http:/www.codeproject.com/KB/silverlight/DatabaseDeepZoom.aspx, 8 pages.

U.S. Official Action dated Jan. 13, 2012 in U.S. Appl. No. 12/365,179.

U.S. Official Action dated Aug. 10, 2012 in U.S. Appl. No. 12/365,179.

* cited by examiner

DATABASE APPLICATION NAVIGATION

BACKGROUND

Some database management programs allow developers to create database applications for performing certain functions with respect to a database. For instance, a database application might be created that allows a user to track donations to a school or charity. Users typically access database applications such as this through the database management program (referred to herein as a "database client application program" or simply a "database client") utilized to create the database application or a runtime version of the database client. As a result, a user that does not have a copy of the database client or a runtime version installed on their computer will not be able to utilize the database application.

In order to facilitate collaboration and to allow users without a copy of a database client application program to access and utilize a database application, a version of the database application may be created that can be accessed using a World Wide Web ("Web") browser and a local or wide area network. When using such a Web-accessible version of a database application, users can copy and paste uniform resource locators ("URLs") utilized by the Web-based database application. When a user returns to such a URL, the user expects to see the same data they saw at the time they copied the URL. The user may be frustrated or confused if the Web-based database application returns a different result.

It is with respect to these and other considerations that the disclosure presented herein has been made.

SUMMARY

Concepts and technologies are described herein for navigating a database application. According to embodiments presented herein, a database server application program is configured to provide a programmable interface into a database application by way of a URL. Properly formatted URLs can be utilized to fetch particular results from the database application. The URLs are also updated programmatically by the database server application to reflect the correct path to the currently displayed data. Through the use of this mechanism, a URL that is copied and later utilized to return to the database application will return consistent data from the database application.

According to one embodiment presented herein, a database server application program is provided that is configured to provide a programmable interface into a database application by way of a URL (referred to herein as a "database services URL"). Database services URLs are URLs that can be utilized to fetch particular results from a database application. According to one implementation, a database services URL includes a first parameter that identifies a path to a target subform control that loads a requested database object. In one embodiment, the requested database object is a data-bound form or report. A subform control is a user interface control that can be utilized within a Web browser to display a database object such as a form or a report.

According to other implementations, the database services URL includes a second parameter that identifies the name of the database object to be loaded in the subform control. The database services URL might also include a third parameter identifying a type for the database object to be loaded. For instance, the third parameter might identify whether the database object is a database form or a database report. According to some implementations, the database services URL also includes a fourth parameter that identifies a particular page of the database object that should be made the currently displayed page. A fifth parameter may also be provided that identifies a data mode for the requested database object. For instance, the fifth parameter might indicate whether the database object should be provided in an add mode, an edit mode, or a read-only mode of operation. The database services URL might also include a sixth parameter for specifying a WHERE condition for a record source of the database object. The WHERE condition can be utilized to filter down the actual data that is displayed in the form or report. Other parameters, such as parameters for specifying how the data is filtered or sorted might also be provided.

According to some implementations, the database services URL utilized by the database application can be updated programmatically by program code executing within or under the control of the database server application program. For instance, a macro action may be executed for opening a form in a Web browser. Execution of the macro action will update the database services URL to properly reflect the database services URL of the opened form. In a similar fashion, macro actions for opening reports, showing records, displaying a form or report, browsing to a database object in-place, and for performing other functions may update the database services URL appropriately. Similarly, selection of user interface controls provided for navigating the database application, such as a navigation control, may also cause the database services URL to be updated. It should be appreciated that the term "macro action" as utilized herein refers to macros provided by the database application. It should be appreciated that other types of executable components may also be utilized to provide similar functionality.

According to other implementations, a macro action is provided herein for use in conjunction with a database server application that provides functionality for displaying a database object, such as a form or report, in-place in a Web browser. Through the use of the macro action, referred to herein as the BrowseTo macro action, the current view of a form or report can be changed while maintaining the context of the database application. According to one implementation, the BrowseTo macro action takes parameters identifying a path to a subform control, identifying a name of the database object to be displayed, and identifying the type of database object. In some implementations, parameters identifying a page of the database object that should be displayed as the current page, identifying a data mode for the database object, and for specifying a WHERE condition for a record source of the database object to be displayed by the BrowseTo macro action may also be supplied and utilized when displaying the database object in-place.

It should be appreciated that the above-described subject matter may also be implemented as a computer-controlled apparatus, a computer process, a computing system, as an article of manufacture such as a computer readable storage medium, or in another manner. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
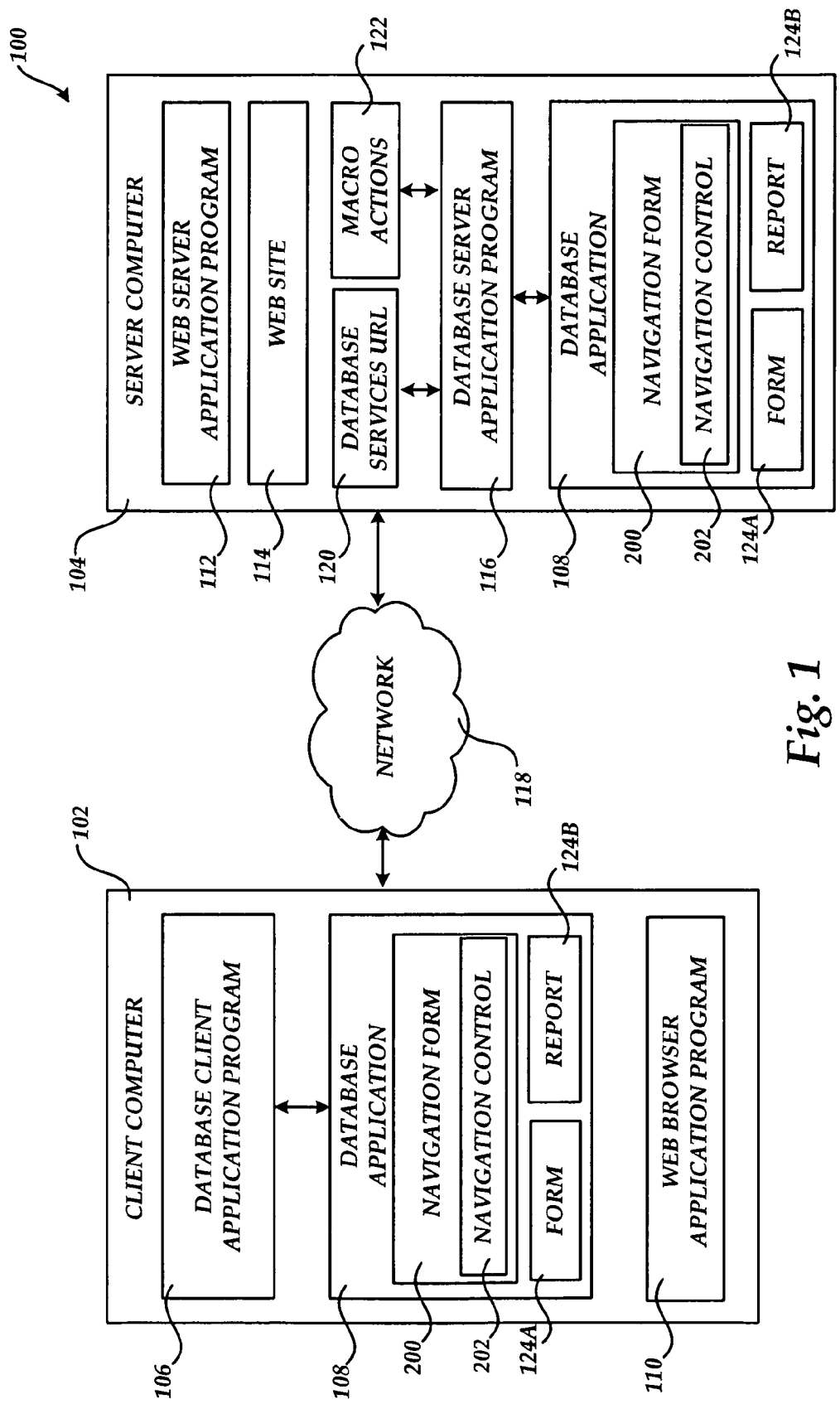
FIG. 1 is a network and computer architecture diagram showing aspects of an illustrative operating environment and several software components provided by the embodiments presented herein.

The following detailed description is directed to technologies for navigating a database application. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements throughout the several figures, concepts and technologies for navigating a database application will be described.

Turning now to FIG. 1, details will be provided regarding an illustrative operating environment and several software components provided by the embodiments presented herein. In particular, FIG. 1 shows aspects of a system 100 for providing a database application 108. As shown in FIG. 1, the system 100 includes a client computer 102 and a server computer 104 that are interconnected by a network 118. It should be appreciated that the configuration illustrated in FIG. 1 is merely illustrative and that additional computing systems and networks not shown in FIG. 1 may be utilized in various embodiments presented herein. It should also be appreciated that while the network 118 is described herein as being a wide area network ("WAN"), such as the Internet, other types of local and WANs may also be utilized by the embodiments presented herein.

As illustrated in FIG. 1, the client computer 102 is equipped to execute an operating system and appropriate application program software. In particular, the client computer 102 is configured to execute a database client application program 106. The database client application program 106, which may be referred to herein simply as the "database client", comprises a database application program configured for execution on a client computer 102. For instance, in one implementation, the database client application program 106 comprises the ACCESS database client application program from MICROSOFT CORPORATION of Redmond, Wash. It should be appreciated, however, that database client application programs from other vendors might also be utilized in conjunction with the software components presented herein.

As also illustrated in FIG. 1, the database client application program 106 is configured in embodiments to allow a user to create a database application 108. The database application 108 may be executed by the database client application program 106 or a runtime version of the database client. Through the use of the database application 108, a user of the client computer 102 can interact with a database in various ways supported by the database application 108. It should be appreciated that, in one embodiment, the database application 108 is self contained, including the actual database upon which the database application 108 operates.

According to one embodiment presented herein, the database client application program 106 is further configured to allow a user to define a navigation form 200 as part of database application 108. As will be discussed in greater detail below with respect to FIG. 2, the navigation form 200 may include a navigation control 202. The navigation control 202 includes selectable tabs that can each be associated with a target, such as a form 124A or a database report 124B. When one of the selectable tabs on the navigation control 202 is selected using an appropriate user input device, the target associated with the selected tab is displayed by the database application 108 in the navigation form 200. Multiple navigation controls 202 may be added to the same navigation form 200.

It should be appreciated that although embodiments presented herein are described as operating in conjunction with a navigation control 202, the embodiments presented herein are not limited to such an implementation. Rather, the embodiments presented herein can be utilized with virtually any type of user interface control provided for navigating a database application.

According to other aspects presented herein, the database client application program 106 also provides functionality for publishing a database application 108, including the navigation form 200 and the navigation control 202, to the server computer 104. In this regard, a user of the client computer 102 may make a request to the database client application program 106 that the database application 108, including the navigation form 200 and the navigation control 202, be published to the server computer 104. In response to receiving such a request, the database client application program 106 is configured to communicate with a Web site 114 via the Web server application program 112 to cause the database application 108 to be published to the server computer 104. In this regard, the database client application program 106 may generate a data file utilizing the extensible markup language ("XML") or the extensible application markup language ("XAML"). It should be appreciated that other types of markup languages or data file formats may be utilized to transmit this information to the server computer 104.

By publishing to the server computer 104, the database application 108, including the navigation form 200 and the navigation control 202, can be made available by the server computer 104 through a Web interface. In particular, the Web site 114 is configured in one embodiment to receive and respond to requests received from a Web browser application program 110 for the navigation form 200 and the navigation control 202. A version of the database client application program 106, referred to herein as the database server application program 116, may be executing on the server computer 104. Through the use of the database server application program 116, the various features of the database application 108, including the navigation form 200 and the navigation control 202, can be made available through the Web site 114.

According to one embodiment presented herein, the Web site 114 comprises the SHAREPOINT collaboration system from MICROSOFT CORPORATION of Redmond, Wash. It should be appreciated, however, that the embodiments presented herein may be utilized with other types of Web sites from other vendors. It should also be appreciated that although a Web browser application program 110 is described herein as being utilized to interact with the Web site 114, including the navigation form 200 and the navigation control 202, any type of program capable of requesting and rendering a Web page may be utilized.

As will be described in greater detail below with respect to FIGS. 3-6, the database server application program 116 is configured in some embodiments to provide a programmable interface into the database application 108 by way of a URL 120 (referred to herein as a "database services URL"). Database services URLs are URLs that can be utilized to fetch particular results from the database application 108, such as a form 124A, a report 124B, or another type of database object. As will also be disclosed in greater detail below, the database services URL 120 is also updated programmatically by the database server application program 116 to reflect the correct path to the currently displayed data. Through the use of this mechanism, a URL that is copied and later utilized to return to the database application will return consistent data from the database application 108.

Figure 2:
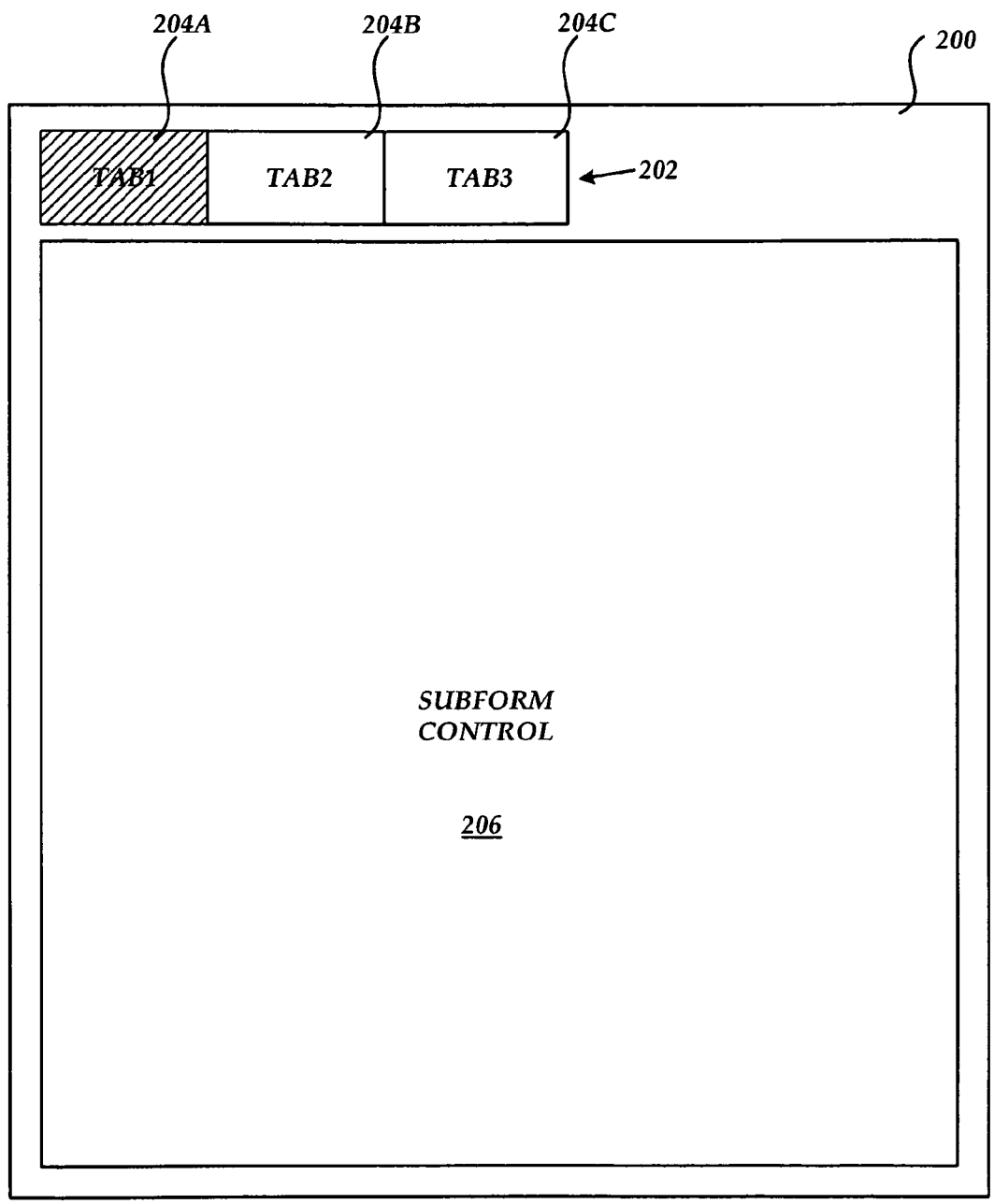
FIG. 2 is a user interface diagram showing aspects of a navigation control utilized in one embodiment presented herein.

Referring now to FIG. 2, additional details will be provided regarding the operation of the navigation form 200 and the navigation control 202 in one embodiment presented herein. In particular, FIG. 2 illustrates a rendering of the form 200 generated by the Web browser application 110. As discussed briefly above, the navigation control 202 includes a number of tabs 204A-204C. The tabs 204A-204C may each be associated with a target, such as a form 124A or a report 124B. When one of the tabs 204A-204C is selected, the associated target is displayed in the subform control 206. As discussed above, the subform control 206 is a user interface control that can be utilized within the Web browser application program 110 to display a database object such as a form or a report. It should be appreciated that multiple navigation controls 202 may be cascaded. Moreover, the navigation control 202 may be located at other locations on the form 202, such as on the left, bottom, or right hand side. Additionally, the tabs 204A-204C may take other shapes or be represented as hyperlinks.

As discussed briefly above with respect to FIG. 1, the database server application program 116 is configured in one embodiment to provide an interface into the database application 108 by way of a database services URLs 120. In order to ensure that the database services URL 120 maintains the correct path to the database object displayed by the subform control 206, the database services URL 120 is updated each time one of the tabs 204A-204C is selected. As will be described in greater detail below, the database services URL 120 may also be updated following the selection of other user interface controls provided for navigating the database application 108 and in response to the execution of programmatic components by the database application 108. Details regarding this functionality will be provided below with respect to FIGS. 3-7.

Figure 3:
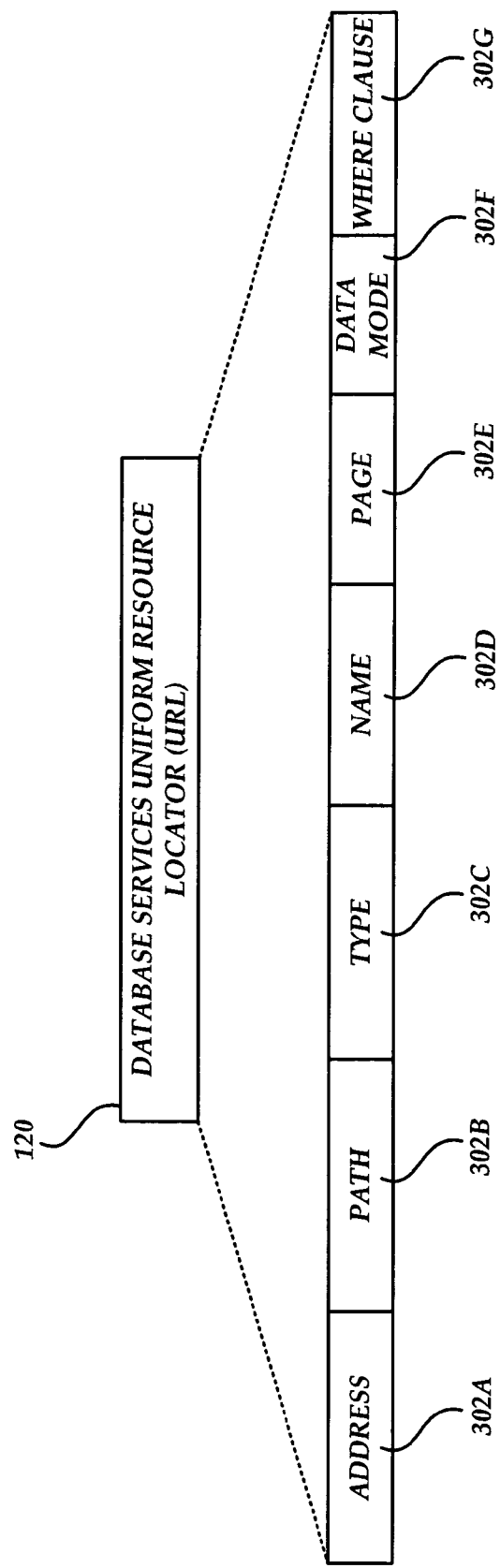
FIG. 3 is a data structure diagram illustrating aspects of a database services uniform resource locator provided in embodiments presented herein.
Figure 4:
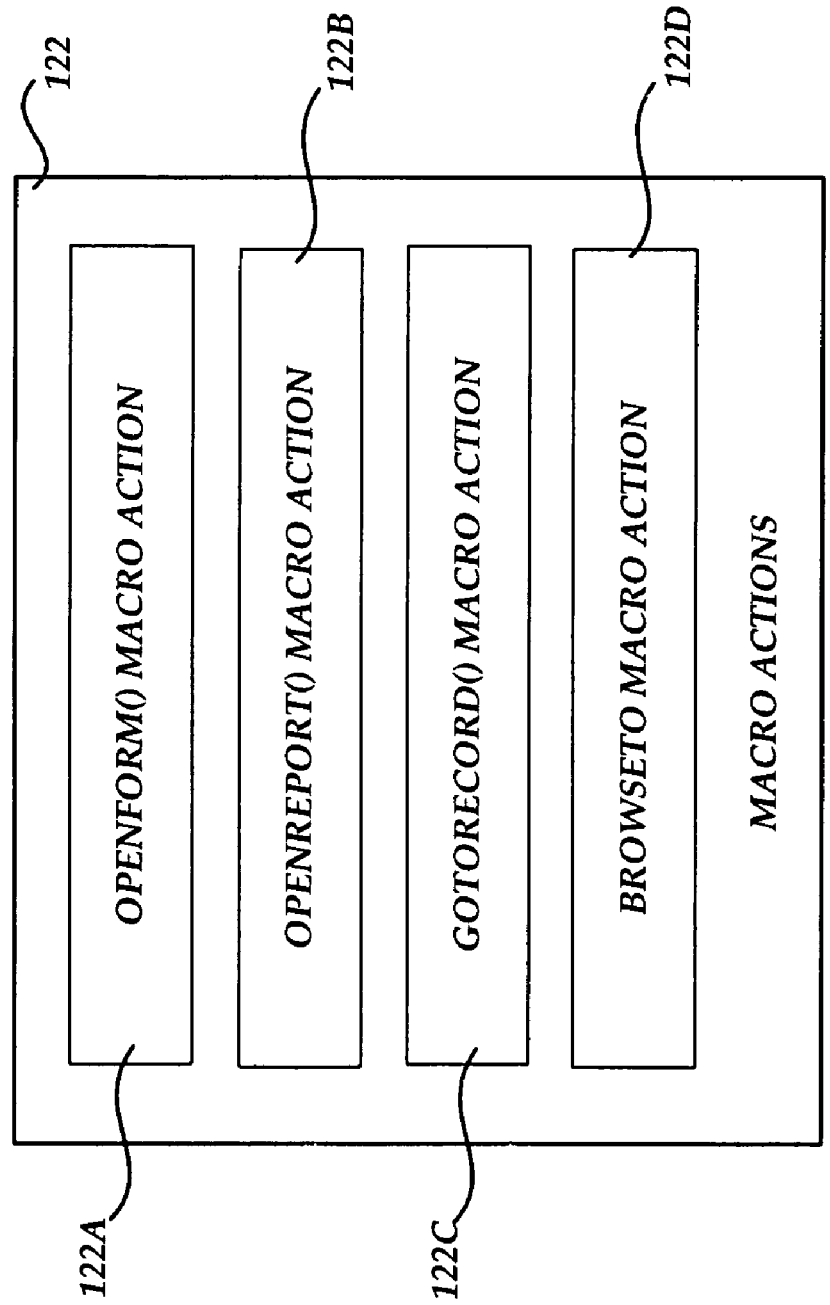
FIG. 4 is a software diagram showing several macro actions that utilize various technologies presented herein in embodiments.

Turning now to FIG. 3, a data structure diagram illustrating aspects of a database services URL 120 provided in some embodiments will be described. As shown in FIG. 3, the database services URL 120 includes an address 302A and several parameters 302B-302G. According to some implementations, the address 302A is formatted with a server address and an indication that the remainder of the URL 120 is a bookmark into the requested page. This allows the URL 120 to change without the Web browser application program 110 reloading the page. For instance, when utilized with the hypertext transport protocol ("HTTP"), the address 302C may take the form of "http://address/pagename#". It should be appreciated that the address 302A may be specified for use with other types of protocols and formatted using a network address of the appropriate server computer 104 hosting the database application 108.

As mentioned briefly above, the database services URL 120 further includes a number of parameters 302B-302G. In some embodiments, the parameters 302B-302G are specified in the order illustrated in FIG. 3. It should be appreciated however, that the order of the parameters 302B-302G may be different in other embodiments and that some of the parameters may not be utilized in every request.

In some implementations, the database services URL 120 includes a first parameter 302B that identifies a path to a subform control 206. In particular, this parameter identifies a path from a main form of the database application 108 to a target subform control 206 that loads a specified database object. The main form of the database application 108 is a form that is loaded directly into the browser window provided by the Web browser 110. As utilized herein, the term "database object" may refer to a form 124A, a report 124B, or another type of object provided by the database application 108.

It should be appreciated that, according to an embodiment, the parameter 302B may be utilized to load subforms other than the object that is identified by the parameter 302D. For instance, in one scenario, if a first form is open that contains a first subform, the parameter 302B identifies the first subform and the form identified by the parameter 302D is loaded into that subform. In another scenario, the target path might be specified by a parameter 302B such as: "Form1.Subform1>Form2.Subform2>Form3.Subform3". This parameter means that a second form should be loaded into the first subform and then a third form should be loaded into the second subform of the second form. This also specifies that the form specified by the parameter 302D should be loaded into the third form's third subform. It should be appreciate that other more or less complex scenarios may also be utilized with the technologies presented herein.

According to implementations, the database services URL 120 also includes a second parameter 302D that identifies the name of the database object that loads inside the specified subform control 206. As will be discussed in greater detail below, the object specified by the parameter 302D is also the database object that the parameters 302B, 302F, and 302G are applied to. According to one implementation, the database services URL 120 also includes a third parameter 302C that identifies a type for the database object that is to be loaded into the subform control 206. For instance, in one implementation, the parameter 302C identifies whether the database object is a database form 124A or a report 124B.

According to some embodiments, the database services URL 120 might include a fourth parameter 302E that identifies a page of the database object to be loaded into the subform control 206 that should be displayed as the current page. A fifth parameter 302F may also be provided in the database services URL 120 that identifies a data mode for the database object displayed in the subform control 206. For instance, the parameter 302F might indicate whether the database object is opened in an add, edit, or read-only mode of operation. If the parameter 302F is not specified, parameters associated with the form hosting the subform control 206 may be utilized to determine whether the database object hosted in the subform control 206 is opened in the add, edit, or read-only mode of operation.

According to some embodiments, a sixth parameter 302G may be specified that includes a WHERE condition for a record source of the database object hosted by the subform control 206. If specified, the value of the parameter 302G replaces the WHERE condition of the database object hosted in the subform control 206. It should be appreciated that the WHERE condition can be utilized to specify the actual data displayed by the database object hosted in the subform control 206. As will be discussed in greater detail below, the database services URL 120 and the parameters 302B-302G are utilized by the database server application program 116 to identify a specific portion of the database application 108. Additional details regarding the operation of the database server application program 116 in this regard are provided below.

As discussed briefly above, the database services URL 120 utilized by the database server application program 116 can be updated programmatically by program code executing within or under the control of the database server application program 116. In particular, a programmer may utilize macro actions 122 shown in FIG. 4 to implement aspects of the database application 108. For instance, in some embodiments an OpenForm( ) macro action 122A may be utilized to open a form 124A. An OpenReport( ) macro action 122B may be similarly utilized to open a report 124B. Likewise, a GoToRecord( ) macro action 126C may be utilized to display a specific record within a form 124A or a report 124B. A BrowseTo macro action 122D is also provided in embodiments that permits the database application 108 to cause the Web browser application 110 to browse to a database object without changing the context of the main form. Additional details regarding the BrowseTo macro action 122D are provided below with reference to FIG. 7.

According to various embodiments, the macro actions 122A-122D are configured to update the database services URL 120 following the performance of their respective functions. Because the macro actions 122A-122D are configured to update the database services URL 120, a developer of the database application 108 need not explicitly program this functionality. For instance, the GoToRecord( ) macro action 122C will update the database services URL 120 to reflect the correct path to the displayed record. As will be discussed in greater detail below with respect to FIG. 7, the BrowseTo macro action 122D will update the database URL 120 to reflect the correct path to a displayed form 124A or report 124B. Additional details regarding the operation of the macro actions 122A-122D will be provided below with reference to FIG. 6.

It should be appreciated that, according to some embodiments, the database server application program 116 is configured to update the database services URL 120 in response to other types of input. For instance, when a request is received through a user interface control provided through the Web browser application program 110 to browse to a particular database object provided by the database application 108, the database server application program 116 will update the database services URL 120 to reflect the correct path to the displayed object. For instance, in one implementation, the database server application program 116 is configured to update the database services URL 120 in response to the selection of one of the tabs 204A-204C in the navigation control 202 described above with respect to FIGS. 1-2. It should be appreciated that the database services URL 120 may also be updated by the database server application program 116 in response to the selection of other types of user interface controls for navigating the database application 108.

Figure 5:
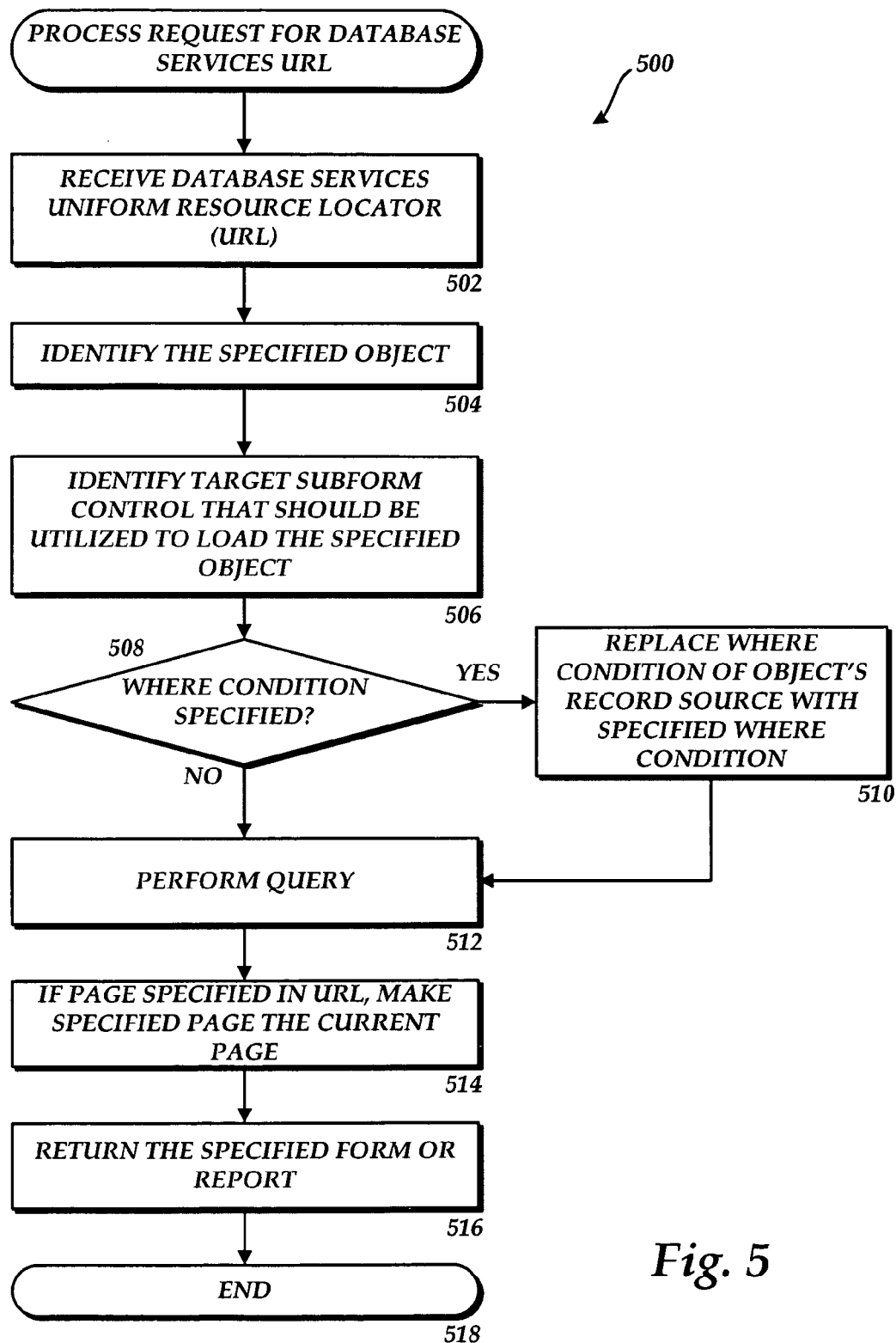
FIGS. 5-7 are flow diagrams showing various routines that illustrate aspects of embodiments presented herein for processing a request for a database services uniform resource locator, updating a database services uniform resource locator, and executing a macro action for browsing to a form or report, respectively, according to embodiments presented herein.

FIG. 5 is a flow diagram showing aspects of one process for processing a database services URL 110 according to one embodiment presented herein. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

The routine 500 begins at operation 502, where the database server application program 116 receives a database services URL 120 from the Web browser application program 110. In response to receiving a database services URL 120, the database server application program 116 identifies the desired database object at operation 504. In this regard, the database server application program 116 may utilize the data specified by the parameter 302D to identify the requested database object. Once the requested database object has been identified, the routine 500 proceeds to operation 506.

At operation 506, the database server application program 116 loads the specified form and subforms and identifies the target subform control 206 that should be utilized to load the specified object. In this regard, the data specified by the parameter 302B may be utilized to identify the appropriate subform control 206 for loading the specified database object. Once the target subform control 206 has been identified, the routine 500 proceeds to operation 508, where the database server application program 116 determines whether a WHERE condition has been specified in the parameter 302G. If so, the routine 500 proceeds to operation 510, where the database server application program 116 replaces the WHERE condition of the object's record source with the WHERE condition specified in the parameter 302G. The routine 500 then proceeds from operation 510 to operation 512.

At operation 512, the requested form 124A or report 124B, as specified in the parameter 302C is generated. It should be appreciated that generation of the form 124A or report 124B may involve the performance of a query by the database server application program 116. Once the requested form 124A or report 124B has been generated, the routine 500 proceeds to operation 514, where the page specified by the parameter 302E is made the current page of the requested form 124A or report 124B. The routine 500 then proceeds to operation 516, where the requested form 124A or report 124B is returned to the Web browser application program 110 for display in the identified subform control 206. The data mode of the returned database object is also set equal to the value specified by the parameter 302F. Once the Web browser application 110 receives the database object, it is displayed in the subform control 206. From operation 516, the routine 500 proceeds to operation 518, where it ends.

Figure 6:
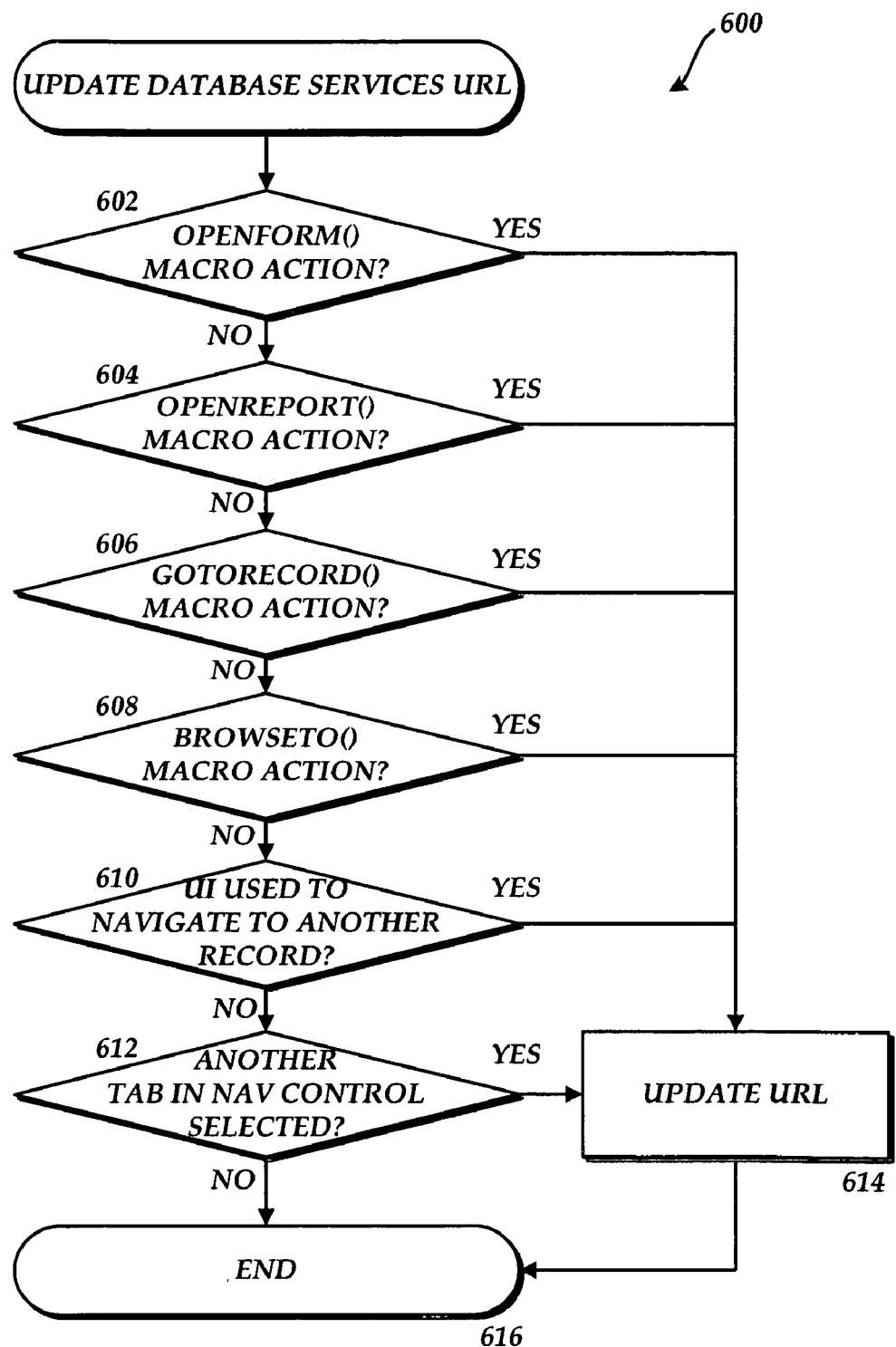

Turning now to FIG. 6, an illustrative routine 600 will be described illustrating aspects of the operation of the database server application 116 for updating the database services URL 120. As discussed above, the database services URL 120 is updated in response to the execution of certain macro actions 122A-122D or other program components. The routine 600 shown in FIG. 6, illustrates this process according to one illustrative embodiment.

The routine 600 begins at operation 602, where the database server application program 116 determines whether the OpenForm( ) macro action 122A has been executed. If so, the routine 600 proceeds to operation 614, where the database services URL 120 is updated to reflect the recently opened form. If the OpenForm( ) macro action 122A has not been executed, the routine 600 proceeds from operation 602 to operation 604, where a determination is made as to whether the OpenReport( ) macro action 122B has been executed. If so, the routine 600 proceeds to operation 614, where the database services URL 120 is updated to reflect the correct path to the recently opened report. If a report has not been opened, the routine 600 proceeds from operation 604 to operation 606.

At operation 606, a determination is made as to whether the GoToRecord( ) macro action 122C has been executed. If so, the routine 600 proceeds from operation 606 to operation 614, where the database services URL 120 is updated to reflect the correct path to the recently opened record. If the GoToRecord( ) macro action 122C has not been executed, the routine 600 proceeds from operation 606 to operation 608. At operation 608, the database server application program 116 determines whether the BrowseTo macro action 122D has been executed. If so, the database services URL 120 is updated to reflect the form 124A or report 124B that was displayed utilizing the BrowseTo macro action 122D at operation 614. If the BrowseTo macro action 122D was not executed, the routine 600 proceeds from operation 608 to operation 610, where the database server application program 116 determines whether a user interface control was utilized to navigate to another form 124A, report 124B, or record provided by the database application 108. If so, the database server application program 116 updates the database services URL 120 to reflect the appropriate path at operation 614.

At operation 612, the database server application program 116 determines whether one of the tabs 204A-204C in the navigation control 202 was selected. If so, the routine 600 proceeds from operation 612 to operation 614, where the database server application program 116 updates the database services URL 120 to reflect the target of the selected tab 204A-204C. If one of the tabs 204A-204C was not selected at operation 612, the routine 600 proceeds to operation 616, where it ends.

It should be appreciated that, in some embodiments, the database server application program 116 is configured to update the database services URL 120 following the execution of software components other than the macro actions 122A-122D. In particular, the database server application program 116 may be configured to update the database services URL when a view of the database application 108 provided within the Web browser application 110 is changed. In this way, the database services URL 120 is continually maintained in an appropriate state. As a result, predictable results will be provided to a user that copies the database services URL 120 and later uses the URL 120 to return to the database application 108.

Figure 7:
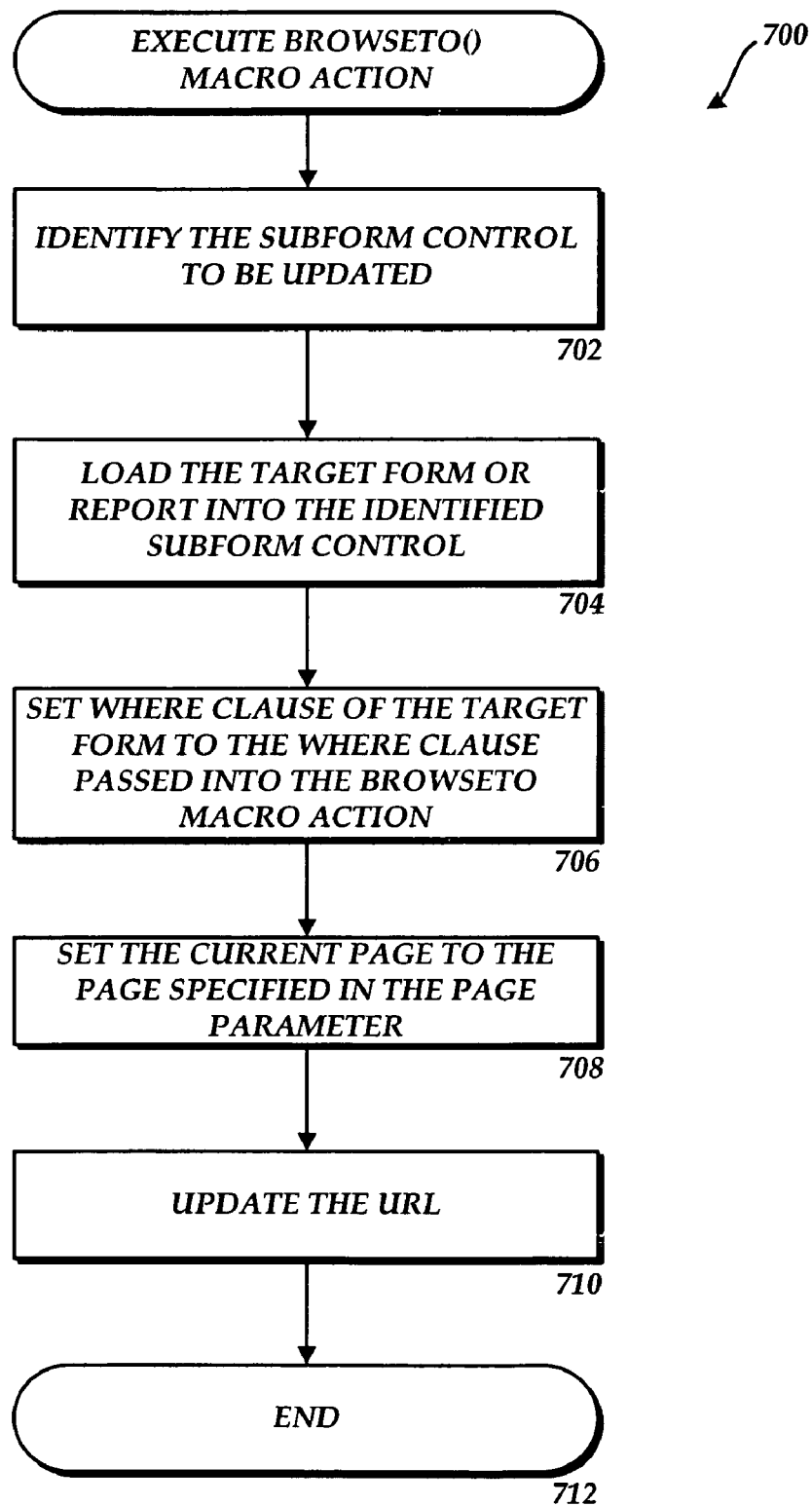

Referring now to FIG. 7, additional details will be provided regarding the operation of the BrowseTo macro action 122D. As discussed briefly above, the BrowseTo macro action 122D provides functionality for changing the current view of a form 124A or report 124B within the Web browser application 110 while maintaining the context of the database application 108.

According to one implementation, the BrowseTo macro action 122D takes parameters similar to those utilized in the database services URL 120. In particular, in one implementation, the BrowseTo macro action 122D takes a parameter identifying a path to a subform control 206, a parameter identifying a name of the database object to be displayed within the subform control 206, and a parameter identifying the type of database object. In some implementations, parameters identifying a page of the database object that should be displayed as the current page, identifying a data mode for the database object, and for specifying a WHERE condition for a record source of the database object to be displayed by the BrowseTo macro action 122D may also be supplied and utilized when displaying the database object in-place in the Web browser application 110.

FIG. 7 shows one illustrative routine 700 illustrating the operation of the BrowseTo macro action 122D. In particular, the routine 700 begins at operation 702, where the subform control 206 to be updated is identified based upon a parameter supplied with the BrowseTo macro action 122D. Once the subform control 206 has been identified, the routine 700 proceeds to operation 704, where the target form 124A or report 124B is loaded into the identified subform control 206. The routine 700 then proceeds to operation 706, where the WHERE clause of the target form 124A or report 124B is set to the WHERE clause passed into the BrowseTo macro action 122D. The routine 700 then continues to operation 708, where the current page of the displayed form 124A or report 124B is set to the page specified in the parameter passed to the BrowseTo macro action 122D. Once the current page has been set, the routine 700 proceeds to operation 710, where the BrowseTo macro action 122D updates the database services URL 120 to reflect the displayed form 124A or report 124B. From operation 710, the routine 700 proceeds to operation 712, where it ends.

Figure 8:
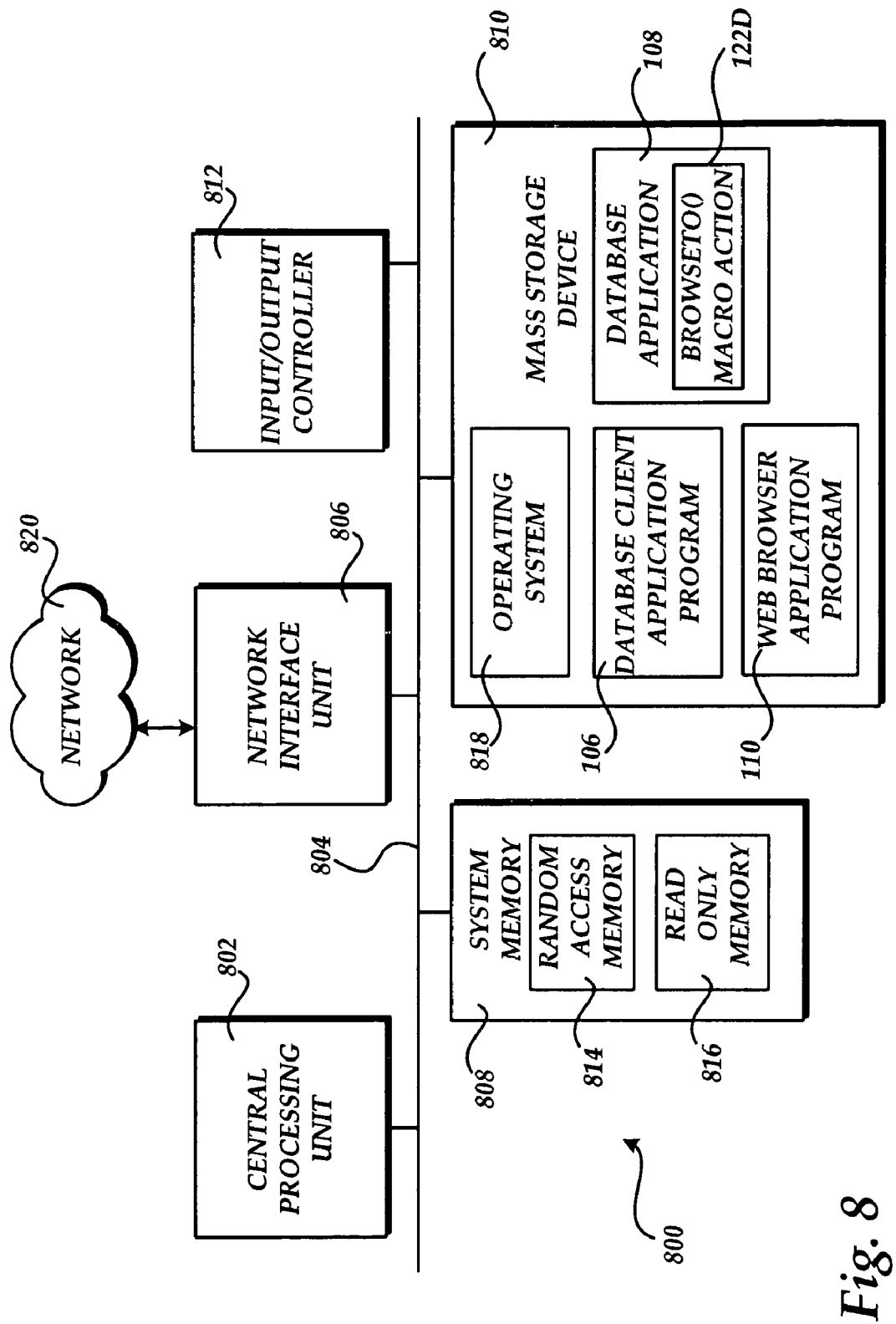
FIG. 8 is a computer architecture diagram showing an illustrative computer hardware and software architecture for a computing system capable of implementing aspects of the embodiments presented herein.

FIG. 8 shows an illustrative computer architecture for a computer 800 capable of executing the software components described herein. The computer architecture shown in FIG. 8 illustrates a conventional desktop, laptop, or server computer and may be utilized to execute any aspects of the software components presented herein described as executing on the client computer 102 or the server computer 104.

The computer architecture shown in FIG. 8 includes a central processing unit 802 ("CPU"), a system memory 808, including a random access memory 814 ("RAM") and a read-only memory ("ROM") 816, and a system bus 804 that couples the memory to the CPU 802. A basic input/output system containing the basic routines that help to transfer information between elements within the computer 800, such as during startup, is stored in the ROM 816. The computer 800 further includes a mass storage device 810 for storing an operating system 818, application programs, and other program modules, which are described in greater detail herein.

The mass storage device 810 is connected to the CPU 802 through a mass storage controller (not shown) connected to the bus 804. The mass storage device 810 and its associated computer storage media provide non-volatile storage for the computer 800. Although the description of computer storage media contained herein refers to a mass storage device, such as a hard disk or CD-ROM drive, it should be appreciated by those skilled in the art that computer storage media can be any available computer storage media that can be accessed by the computer 800.

By way of example, and not limitation, computer storage media may include volatile and non-volatile, removable and non-removable media implemented in any method or technology for storage of information such as computer readable and executable instructions, data structures, program modules or other data. For example, computer storage media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 800.

According to various embodiments, the computer 800 may operate in a networked environment using logical connections to remote computers through a network such as the network 820. The computer 800 may connect to the network 820 through a network interface unit 806 connected to the bus 804. It should be appreciated that the network interface unit 806 may also be utilized to connect to other types of networks and remote computer systems. The computer 800 may also include an input/output controller 812 for receiving and processing input from a number of other devices, including a keyboard, mouse, or electronic stylus (not shown in FIG. 8). Similarly, an input/output controller may provide output to a display screen, a printer, or other type of output device (also not shown in FIG. 8).

As mentioned briefly above, a number of program modules and data files may be stored in the mass storage device 810 and RAM 814 of the computer 800, including an operating system 818 suitable for controlling the operation of a networked desktop, laptop, or server computer. The mass storage device 810 and RAM 814 may also store one or more program modules. In particular, the mass storage device 810 and the RAM 814 may store the database client application program 106, the Web browser application program 110, and the database application 108, including the BrowseTo macro action 122D, each of which was described in detail above with respect to FIGS. 1-7. The mass storage device 810 and the RAM 814 may also store other types of program modules and data.

It should be appreciated that the software components described herein may, when loaded into the CPU 802 and executed, transform the CPU 802 and the overall computer 800 from a general-purpose computing system into a special-purpose computing system customized to facilitate the functionality presented herein. The CPU 802 may be constructed from any number of transistors or other discrete circuit elements, which may individually or collectively assume any number of states. More specifically, the CPU 802 may operate as a finite-state machine in response to executable instructions contained within the software modules disclosed herein. These computer-executable instructions may transform the CPU 802 by specifying how the CPU 802 transitions between states, thereby transforming the transistors or other discrete hardware elements constituting the CPU 802.

Encoding the software modules presented herein might also transform the physical structure of the computer storage media presented herein. The specific transformation of physical structure may depend on various factors, in different implementations of this description. Examples of such factors may include, but are not limited to: the technology used to implement the computer storage media, whether the computer storage media is characterized as primary or secondary storage, and the like. For example, if the computer storage media is implemented as semiconductor-based memory, the software disclosed herein may be encoded on the computer storage media by transforming the physical state of the semiconductor memory. For example, the software may transform the state of transistors, capacitors, or other discrete circuit elements constituting the semiconductor memory. The software may also transform the physical state of such components in order to store data thereupon.

As another example, the computer storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer 800 in order to store and execute the software components presented herein. It also should be appreciated that the computer 800 may comprise other types of computing devices, including hand-held computers, embedded computer systems, personal digital assistants, and other types of computing devices known to those skilled in the art. It is also contemplated that the computer 800 may not include all of the components shown in FIG. 8, may include other components that are not explicitly shown in FIG. 8, or may utilize an architecture completely different than that shown in FIG. 8.

Based on the foregoing, it should also be appreciated that technologies for navigating a database application have been disclosed herein. Although the subject matter presented herein has been described in language specific to computer structural features, methodological and transformative acts, specific computing machinery, and computer storage media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer storage medium having computer-executable instructions stored thereupon which, when executed by a computer, causes the computer to:

receive a request for a database object, the request comprising a uniform resource locator (URL) having a first parameter identifying a path to a target subform control that loads the requested database object, a second parameter identifying a name of the database object, and a third parameter identifying a type for the database object;

in response to receiving the request for the database object, identify the database object using the parameters of the URL and cause the requested database object to be displayed in the subform control;

receive a request to execute a macro action; and in response to receiving the request to execute the macro action, update the URL to reflect execution of the macro action.

2. The computer storage medium of claim 1, wherein the URL further comprises a fourth parameter identifying a page of the database object that should be made a current page.

3. The computer storage medium of claim 2, wherein the URL further comprises a fifth parameter identifying a data mode for the database object.

4. The computer storage medium of claim 3, wherein the data mode comprises an add mode, an edit mode, or a read-only mode.

5. The computer storage medium of claim 3, wherein the database object comprises a database form or a database report, and wherein the third parameter identifies whether the database object is a database form or a database report.

6. The computer storage medium of claim 3, wherein the URL further comprises a sixth parameter specifying a where condition for a record source of the database object.

7. The computer storage medium of claim 3, wherein:
the macro action comprises a macro action for opening a form; and
the instructions which, when executed by the computer, cause the computer to, in response to receiving the request, update the URL to reflect the execution of the macro action, comprise instructions which, when executed by the computer, cause the computer to update the URL to reflect opening of the form.

8. The computer storage medium of claim 3, wherein:
the macro action comprises a macro action for opening a report; and
the instructions which, when executed by the computer, cause the computer to, in response to receiving the request, update the URL to reflect the execution of the macro action, comprise instructions which, when executed by the computer, cause the computer to update the URL to reflect opening of the report.

9. The computer storage medium of claim 3, wherein:
the macro action comprises a macro action for showing a record; and
the instructions which, when executed by the computer, cause the computer to, in response to receiving the request, update the URL to reflect the execution of the macro action, comprise instructions which, when executed by the computer, cause the computer to update the URL to reflect displaying of the record.

10. The computer storage medium of claim 3, wherein:
the macro action comprises a macro action for browsing to a database object in-place; and
the instructions which, when executed by the computer, cause the computer to, in response to receiving the request, update the URL to reflect the execution of the macro action, comprise instructions which, when executed by the computer, cause the computer to update the URL to reflect displaying of the database object in-place.

11. The computer storage medium of claim 3, having further computer executable instructions stored thereupon which, when executed by the computer, cause the computer to:
receive a request from a user interface control to display a database object; and
in response to the receiving the request from the user interface control, to cause the database object to be displayed and to update the URL to reflect the displaying of the database object.

12. The computer storage medium of claim 11, wherein the user interface control comprises a navigation control.

13. A computer-implemented method for displaying a database object in-place, the method comprising performing computer-implemented operations for:
receiving a request to execute a macro action for displaying a database object in-place, the request comprising a uniform resource locator (URL) having a first parameter identifying a path to a target subform control that loads the requested database object, a second parameter identifying a name of the database object, and a third parameter identifying a type for the database object; and
in response to receiving the request for the database object, identifying the database object using parameters, causing the requested database object to be displayed in-place in the subform control, and updating the URL to reflect the displaying of the database object.

14. The computer-implemented method of claim 13, wherein the request further comprises a fourth parameter identifying a page of the database object that should be made a current page when the database object is displayed in-place in the subform control.

15. The computer-implemented method of claim 14, wherein the request further comprises a fifth parameter identifying a data mode for the database object.

16. The computer-implemented method of claim 15, wherein the data mode comprises an add mode, an edit mode, or a read-only mode.

17. The computer-implemented method of claim 16, wherein the database object comprises a database form or a database report, and wherein the third parameter identifies whether the database object is a database form or a database report.

18. The computer-implemented method of claim 17, wherein the request further comprises a sixth parameter specifying a where condition for a record source of the database object.

19. A computer system, comprising:
a processor; and
a memory in communication with the processor, the memory comprising instructions which, when executed by the processor, cause the processor to
receive a request for a database object, the request comprising a uniform resource locator (URL) having a first parameter identifying a path to a target subform control that loads the requested database object, a second parameter identifying a name of the database object, and a third parameter identifying a type for the database object,
in response to receiving the request for the database object, identify the database object using the parameters of the URL and cause the requested database object to be displayed in the subform control;
receive a request to execute a macro action; and
in response to receiving the request to execute the macro action, update the URL to reflect execution of the macro action.

20. The computer system of claim 19, wherein:
the macro action comprises a macro action for opening a form, a macro action for opening a report, a macro action for showing a record, or a macro action for browsing to a database object in-place; and
the instructions which, when executed by the processor, cause the processor to, in response to receiving the request, update the URL to reflect the execution of the macro action, comprise instructions which, when executed by the processor, cause the processor to
if the macro action comprises the macro action for opening the form, update the URL to reflect opening of the form,
if the macro action comprises the macro action for opening the report, update the URL to reflect opening of the report,
if the macro action comprises the macro action for showing the record, update the URL to reflect showing the record, and
if the macro action comprises the macro action for browsing to the database object in-place, update the URL to reflect displaying of the database object in-place.

* * * * *